R. C. MITCHELL.
POWER TRANSMISSION MECHANISM.
APPLICATION FILED DEC. 20, 1901.

1,028,128.

Patented June 4, 1912.

2 SHEETS—SHEET 1.

Witnesses:

Inventor
Robert C. Mitchell

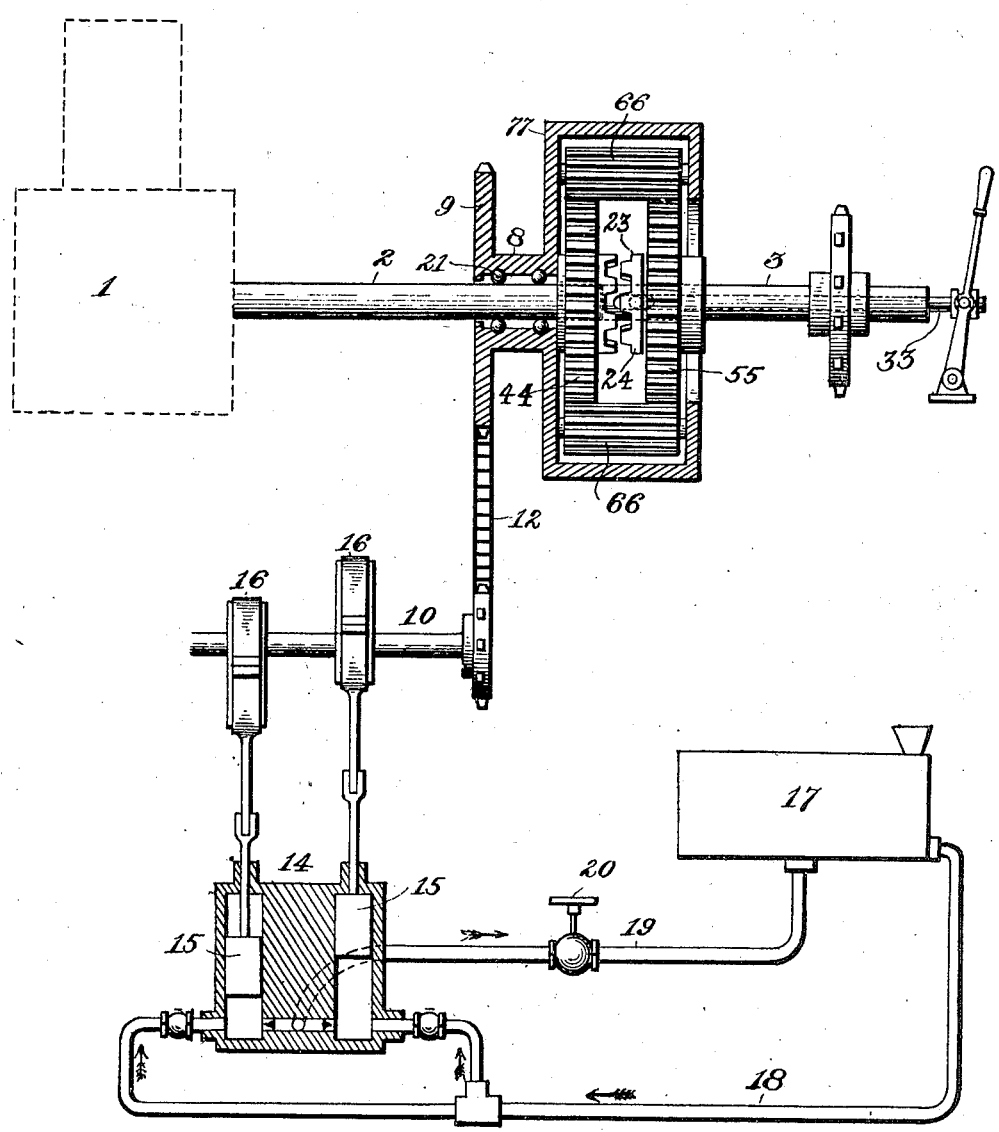

UNITED STATES PATENT OFFICE.

ROBERT C. MITCHELL, OF MOUNT VERNON, NEW YORK.

POWER-TRANSMISSION MECHANISM.

1,028,128.   Specification of Letters Patent.   Patented June 4, 1912.

Application filed December 20, 1901. Serial No. 86,646.

*To all whom it may concern:*

Be it known that I, ROBERT C. MITCHELL, a citizen of the United States, residing at Mount Vernon, in the county of Westchester and State of New York, have invented certain new and useful Improvements in Power-Transmission Mechanism, of which the following is a full, clear, and exact description.

My invention relates to power transmission mechanism for automobiles and the like, and particularly to means for variably controlling the speed of the transmitted movement relatively to the source of power.

The object of my invention is to provide a simple, comparatively inexpensive, efficient and durable means for accomplishing the above end, to wit, securing variable control.

The invention is of particular utility in connection with automobiles propelled by engines which to attain their highest efficiency run at a substantially uniform speed; for example, a gas engine of the explosion type. In order to vary the speed of travel of the vehicle, it is essential to modify the transmitted speed of the motor. This is accomplished positively and accurately throughout the full range from zero to the maximum speed.

The embodiment of and the application of my invention may be modified and changed in a great variety of ways. It should therefore be understood that the accompanying drawings are purely conventional and illustrative of one plan or arrangement only.

Figure 1:
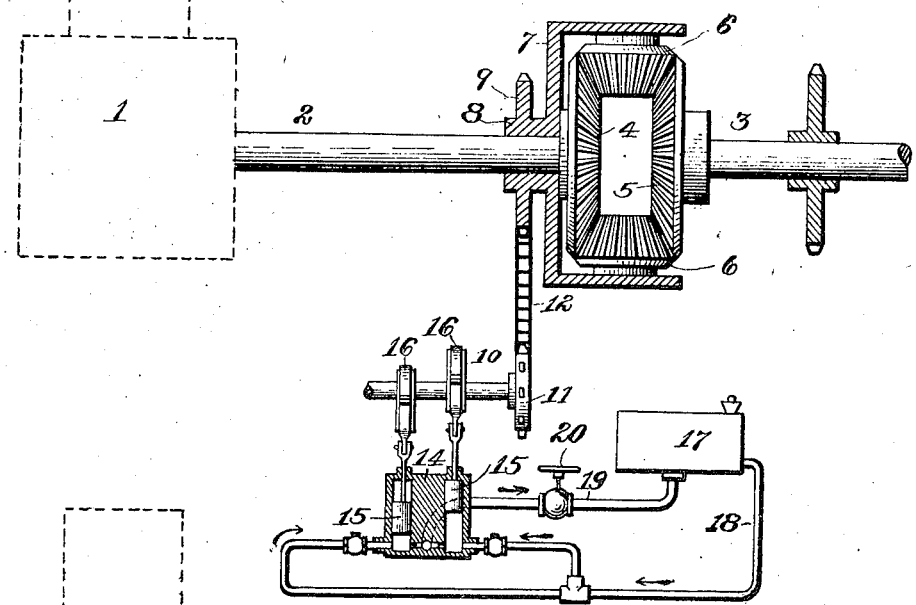
Figure 1:
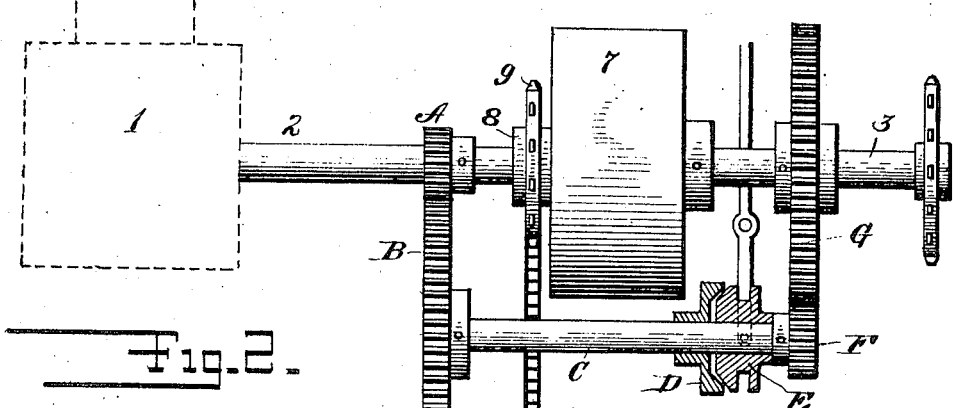
Figure 2:
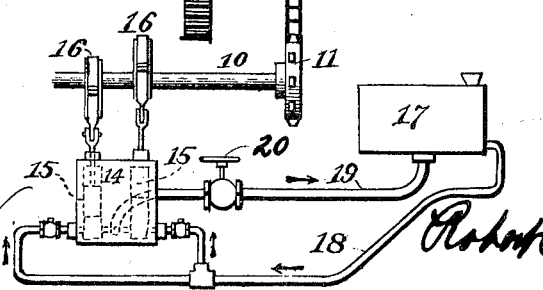

In the drawings: Figure 1 is a diagrammatic view of my invention, some the parts being shown in section. Fig. 2 is a similar view except as to the sections. In this view an added feature of construction is shown. Fig. 3 is a view similar to Fig. 1 illustrative of modifications.

In the particular construction shown, 1 is a motor.

2 is a driving shaft.

3 is a driven shaft.

Between the driving and the driven shaft is a transmission gear of the planetary or differential type. In Fig. 1 the driving shaft 2 carries a bevel gear 4. The driven shaft 3 carries a bevel gear 5. Meshing with the gears 4 and 5 is a bevel pinion 6. The number of bevel pinions 6 used is immaterial; for example, two pinions diametrically opposite might be provided as shown in the drawings to better balance the parts.

7 is what will be termed a carrier for the bevel pinion 6. This carrier may be of any desired form and preferably is provided with the hub 8 bearing upon the driving shaft 2 but independent thereof.

9 is a sprocket wheel fixed upon sleeve 8.

10 is a shaft having suitable bearings. 11 is a sprocket wheel fixed thereon.

12 is a chain or belt connecting the sprockets 9, 11.

14 is a pump casing having piston chambers therein in any desired number.

15, 15, are pump plungers or pistons of any desired construction. The pistons are moved by connections with the shaft 10.

17 is a fluid supply tank. 18 is a pipe leading therefrom to the pump casing 15. The supply pipe 18 is adapted to deliver fluid to the various pump chambers in which the pistons 15 move.

19 is a pipe leading from casing 15 and in communication with said piston chambers.

20 is a suitable valve or controller whereby the fluid flowing through the pipe 19 may be permitted to flow fast or slow or may be entirely checked. Suitable check valves may be provided at various points in the system so that the fluid will be caused to flow in one direction or the other. In the drawings the arrows illustrate the flow of the fluid in one direction.

The operation of the mechanism thus far described is as follows: Assuming the driving shaft 2 is being rotated at a definite rate of speed, it is obvious that if the carrier 7 is held stationary the full speed of rotation of the driving shaft 2 will be transmitted to the driven shaft 3 with the gear ratios shown. Manifestly, the gear ratios might be modified as desired. In any event, when the carrier 7 is held stationary, the maximum transmitted speed is passing through the gears 4, 6 and 5. If the carrier 7 is released so as to be free to revolve, power will cease to be transmitted to the driven shaft 3 and the latter will therefore slow down, whereupon the pinion 6 will be caused to travel around and around the gear 5 by the action of the driving shaft and gear wheel 4. This planetary movement of the gear 6 causes the rotation of the carrier 7. When the driven shaft 3 ceases rotating the carrier 7 is being rotated at its maximum speed depending upon the speed of rotation of the driving shaft 2 and the ratio of the gears 4, 6, 5. From the foregoing it is manifest that a means by which the speed of rotation of the carrier 7 may be variably controlled or checked will permit the operator to correspondingly vary and accurately control or check the speed of rotation of the gear carrier 7, and consequently the transmitted speed of the driven shaft 3. Inasmuch as the rotation of the carrier 7 is transmitted to the shaft 10, and inasmuch as the freedom (and therefore necessarily the speed) of rotation of the shaft 10 is controlled by the freedom with which the pumps 15, 15, operate, it follows that the speed of rotation of the carrier is likewise controlled by the movement of the pump 15. Inasmuch as the pumps 15 are controllable by the valve 20, it follows that the speed of rotation of the carrier 7 is controllable by the same means. By opening the valve 20 to its fullest extent it is intended that the pumps shall operate freely, whereupon the carrier 7 is free to rotate. As a consequence, although the driving shaft may be rotating at its definite velocity, no power or speed will be transmitted to the driven shaft 3. The instant the free flow of the fluid is resisted, the carrier 7 is slowed down and power will then be transmitted to the driven shaft 3. By resisting the fluid flow more and more by manipulating the valve 20, the speed of the driven shaft 3 relatively to the driving shaft 2 may be increased until finally when the flow of fluid is checked, the carrier is held stationary and the maximum speed is being transmitted. By this means accurate variation may be effected in the speed of the driven shaft relatively to the driving shaft without the necessity of disconnecting any gears.

For automobile work it is not only desired to have accurate control in the forward speed of the vehicle, but it is also desirable to have a reverse. To that end therefore I have diagrammatically shown in Fig. 2 a reversing mechanism in which A is a pinion fixed upon the driving shaft 2. B is a gear wheel meshing therewith. C is a shaft upon which gear wheel 6 is fixed. D is a clutch member secured to the shaft C. E is another clutch member adapted to co-act with the clutch member D. The clutch member E may be mounted upon a suitable bearing, for example, the shaft C. F is a pinion carried by the clutch member E. G is a gear wheel carried by the driven shaft 3. The clutch member E is normally out of engagement with the clutch member D although the said shaft may be rotating continuously by the action of the driven shaft. When the user desires to reverse the direction of travel of the vehicle, the controller is opened to give free action to the flow of the fluid, whereupon the transmission of power in a direction to give forward movement to the vehicle is checked. The operator then throws the clutch member E into engagement with the clutch member D, and a reverse direction is imparted to the driven shaft 3 through gears A, B, F, G. In the drawings I have shown a sprocket wheel upon the driven shaft from which the power may be taken off to the vehicle wheels or a differential gearing mounted thereon, all of which is too well known to require special illustration.

In Fig. 3 I have shown a modification in which it is apparent that the bevel gears of Fig. 1 are not essential. In Fig. 3, 2 is a driving shaft carrying a spur gear 44 corresponding in function to bevel gear 4. 55 is a spur gear on driven shaft 3 corresponding in function to bevel gear 5. 66 is a spur gear meshing with pinions 44 and 55 and corresponding in function to the pinion 6. 77 is a gear carrier which corresponds in function to carrier 7, Fig. 1. The carrier 77 may be mounted upon ball bearings 21, thus giving freedom of action. Manifestly, ball or roller bearings might be inserted at any desired place. In this figure the driven shaft 3 is hollow. Within the hollow shaft 3 is a rod 33 which is connected at its inner end to a clutch member 23 suitably splined to the driven shaft 3 and capable of being moved longitudinally thereof. 24 is another clutch member carried by the gear wheel 44. By moving the rod 33 in and out the clutch members 23, 24, may be engaged or disengaged at will, thereby taking the power of the engine directly through the shafts from end to end without passing through the pinion 66. While it is true that when these shafts are coupled together the pinion 66 would turn, it would nevertheless turn idly and comparatively little or no force would be required to hold the gear carrier 77 in the stationary position. The particular form of clutch mechanism is immaterial, one convenient form being shown. By this arrangement the full power of the engine is more efficiently transmitted when it is desired to run the driven shafts at top speed, since the load is taken off the pumps.

The term "gear carrier" as used is generic in that it includes any means for carrying the gear having a planetary movement. By the words "planetary gear" as used in the claims, I refer particularly to the gear or pinion having said movement. By "fluid" I mean air, water, oil, spirits, or any element that can fairly be considered to operate as a resistance in a manner similar to any of the said elements.

For convenience of illustration, the pumps are shown somewhat larger relatively to the passage through the pipes 18, 19, than they would probably be in practice. Manifestly, the cross sectional area of the passage through said pipes might be approximately the cross-sectional area of the pump chamber so that when the controller is opened the fluid would flow with sufficient freedom. The construction of the pumps or the means for giving motion to the fluid, and the means for connecting the same to the gear carrier may be modified in any way that would suggest itself to the skilled mechanic. If desired the pump mechanism might be provided with a clutch of well known pattern so that in addition to opening the controller the pumps might be disconnected temporarily from the carrier. By the term "pump" I mean a pump or equivalent means for propelling or giving motion to fluid. In case a pump as such is used, any number of pump plungers may be employed as desired. The method of connecting the pumps to the gear carrier may be modified in many ways without departing from the spirit and scope of my invention.

From the foregoing it will be apparent to the reader that the motive power transmitted through the driving shaft is divided at the differential and that one part or division of the power is conducted to the driven shaft to do the desired work. The other division or part of the power is conducted in another direction to work against the variable and controllable load. Hence, by varying the load which is substantially frictionless the relative speed of one of the driven parts to the other may be changed at will.

What I claim and desire to secure by Letters Patent is:

1. In an apparatus of the character described, a driving shaft, a driven shaft, a planetary wheel connection, a carrier therefor, and a fluid controlled means with external circulating pipes whereby the movement of the carrier may be varied and maintained with substantial uniformity at any desired speed.

2. In an apparatus of the character described, driving and driven shafts, a planetary gear connection between said shafts, a carrier therefor, a fluid controller for said carrier with external circulating pipes whereby the movement of said carrier may be stopped or varied and maintained at any desired speed with substantial uniformity.

3. In an apparatus of the character described, driving and driven shafts, a planetary gear connection between the same, a pump operatively connected therewith, and circulating pipes with means for resisting the speed of operation of said pump and thereby controlling and maintaining the speed transmitted to the driven shaft to qualify it to the desired speed relatively to the driving shaft.

4. In an apparatus of the character described, a driving and a driven shaft, a planetary gear connection, a revoluble gear carrier, means to variably control and maintain at the desired speed of rotation the movement of said carrier, said means including a pump and external circulating pipes, and means to variably yet definitely resist the freedom of flow of the fluid in communication with said pump.

5. In an apparatus of the character described, a train of differential gears including a planetary gear, a carrier for said planetary gear and a fluid resistance with external pipes to control the movement of said carrier whereby the speed on one side of the train may be varied to any desired degree and maintained with substantial uniformity so long as desired relatively to the speed on the other side of the train.

6. In an apparatus of the character described, a differential train, a planetary gear included therein, a carrier therefor, said carrier being loosely mounted to rotate, a fluid pump, circulating pipes and means to control and maintain at the desired speed, the movement of the fluid passing through said pump, said pump being mechanically connected with said carrier.

7. In an apparatus of the character described, a driving and a driven shaft, a gear wheel carried on the end of each of said shafts, a gear intermediate of said gears and meshing therewith, a carrier therefor, a sprocket wheel attached to said carrier, a pump and a sprocket for driving the same, a chain connecting both of said sprocket wheels, a fluid passage entering and leaving the pump chamber, and a control for varying the size of said fluid passage.

8. In an apparatus of the character described, a driving shaft, a driven shaft, a planetary wheel connection, a carrier therefor and a fluid controlled means with circulating pipes whereby the movement of the carrier may be varied and maintained with substantial uniformity at any desired speed, in combination with clutch mechanism for connecting or disconnecting said driving and driven shafts.

9. In a power transmitting apparatus for automobiles and the like, a driving shaft, a driven shaft, and means intermediate of said shafts for connecting or disconnecting the same, whereby the power from one of said shafts may be transmitted directly to the other, in combination with a fluid controlled means including circulating pipes a differential train composed of spur gears whereby the movement of the driven shaft relatively to the driving shaft may be varied and uniformly maintained at any desired speed.

10. In an apparatus for transmitting power derived from a given source, means for dividing the power into two always equal parts, means for conveying one of these parts to be used for any desired work, and a means for conveying the other part to operate an external fluid resistance.

11. In an apparatus for transmitting power derived from a given source, means for dividing the power into two always equal parts, means for conveying one of these parts to be used for any desired work, and means for conveying the other part to operate an external controllable fluid resistance.

12. In an apparatus for transmitting power derived from a given source, a train of differential gears, means for transmitting power to one member of the train and means for connecting another member to a load, a pump with external circulating pipes for imposing upon the remaining member a load of that quantity which, when divided by the resistance offered by the load attached to the second member gives therein the speed required.

13. In an apparatus for transmitting power derived from a given source, a train of differential gears, means for transmitting power to the first member, a pump system for restraining by substantially a frictionless load through external circulating pipes the speed of another member whereby a resultant speed is produced in the remaining member.

14. In an apparatus for transmitting power derived from a given source, a train of differential gears, means for transmitting power to one member of the train and a pump system for restraining by a substantially frictionless and controllable load through external circulating pipes another member thereby producing in the remaining member various resultant speeds.

15. In an apparatus for transmitting power derived from a given source, a train of differential gears, means for transmitting power to one member of the train, a pump system for imposing upon another member a substantially frictionless load through external circulating pipes producing in the remaining member a resultant torque.

16. In an apparatus for transmitting power derived from a given source, a train of differential gears, means for transmitting power to one member of the train and a pump system for imposing upon another member a substantially frictionless and controllable load through external circulating pipes and producing in the remaining member a variable torque.

17. In an apparatus for transmitting power, a fluid controlled means for dividing the power derived from a given source into two always equal parts, and means for causing each of these two parts to perform independent work at different points and at relatively different and variable speeds.

18. In an apparatus for transmitting power derived from a given source, means for dividing this power into two always equal parts, means for conveying one of these parts toward the performance of certain work, means for conveying the other part for the performance of other work, and means, including a fluid for varying the speed of performance of the last work, to vary the speed of performance of the first work.

19. In an apparatus for transmitting a variable power derived from a given source, means for dividing this power into two always equal parts, means for transmitting one part for the performance of certain work, means for transmitting the other part, independently of the first, for the performance of other work, and means for governing the speed of the work performed by the last part, whereby the speed of the work performed by the first part is controlled.

20. In an apparatus for transmitting power derived from a given source, a train of differential gears, means for transmitting power to one member of the train, a pump system for imposing on another member through external pipes a load substantially frictionless whereby a reaction is caused in the third member and means for transmitting from the third member the power developed therein.

21. In an apparatus of the class described, a train of differential gears, means for transmitting power to one member of the train, a pump system for imposing on another member through external pipes a controllable load substantially frictionless thereby causing in the remaining member a corresponding reaction and means for transmitting the power developed in the third member to perform the desired work.

22. In an apparatus of the class described, a train of differential gears, means for transmitting power to one member of the train, a pump system for restraining by a substantially frictionless load through external pipes a second member whereby the remaining member is caused to rotate at a speed equal to the measure of the reaction produced in the second member divided by the resistance which the remaining member encounters and means for transmitting the power developed in said remaining member.

23. In an apparatus of the class described, a train of differential gears, means for driving one member thereof, means for connecting a load to the second member thereof, and a controllable fluid-driven work-performing device for controlling the relative speed between said first and second members, and connections between the fluid-driven device and the third member of said train.

24. The combination of a planetary transmission gear, consisting of a driving member, a driven member and a fulcrum member coöperating with said driving member to impart movement to the driven member, and a stationary circulating pump geared to said fulcrum member.

25. The combination of a planetary transmission gear, consisting of a driving member, a driven member and a fulcrum member coöperating with said driving member to impart movement to the driven member, and a circulating plunger pump coöperating with the fulcrum member.

26. In a speed changing device, the combination with the driving and driven elements, of a planetary transmission element forming a connection therebetween, a fluid brake adapted to act upon said planetary transmission element, means for controlling the fluid therein to vary the action of the brake upon said planetary element and means for holding said controlling means in desired positions of adjustment.

ROBERT C. MITCHELL.

Witnesses:
L. VREELAND,
J. B. BASSETT.